(12) United States Patent
Hussey et al.

(10) Patent No.: US 9,388,819 B2
(45) Date of Patent: Jul. 12, 2016

(54) HVAC BLOWER MOTOR WITH SPEED SENSOR

(75) Inventors: John H. Hussey, St. Louis, MO (US); Keith I. Hoemann, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 1282 days.

(21) Appl. No.: 13/045,593

(22) Filed: Mar. 11, 2011

(65) Prior Publication Data
US 2012/0230839 A1 Sep. 13, 2012

(51) Int. Cl.
*F04B 49/20* (2006.01)
*F04D 27/00* (2006.01)

(52) U.S. Cl.
CPC ............ *F04D 27/001* (2013.01); *F04D 27/004* (2013.01)

(58) Field of Classification Search
CPC ... F04D 25/0666; F04D 25/08; F04D 27/001; F04D 27/004; F04B 2203/0209; H02K 5/225; G01P 3/487
USPC ........ 417/63, 42, 53; 73/494, 514.39; 62/177, 62/178, 180, 186, 404; 324/174; 384/448; 318/400.39, 207.25
See application file for complete search history.

(56) References Cited

U.S. PATENT DOCUMENTS

| | | | | |
|---|---|---|---|---|
| 2,092,927 A * | 9/1937 | Merwitz | ........................ | 40/426 |
| 3,805,161 A * | 4/1974 | Bayha et al. | .................. | 324/161 |
| 4,307,324 A * | 12/1981 | Regnier | ....................... | 388/813 |
| 4,376,915 A * | 3/1983 | Penn | ............................. | 324/168 |
| 4,841,187 A * | 6/1989 | Hauke et al. | .................. | 310/171 |
| 5,280,981 A * | 1/1994 | Schulz | .......................... | 294/106 |
| 5,560,462 A * | 10/1996 | Gustin | ....................... | 192/58.42 |
| 6,073,457 A * | 6/2000 | Kampf et al. | ................... | 62/179 |
| 6,298,449 B1 * | 10/2001 | Carter | .......................... | 713/340 |
| 2003/0086630 A1 * | 5/2003 | Bramel et al. | ............... | 384/476 |
| 2003/0147763 A1 * | 8/2003 | Sakuda et al. | .............. | 418/55.1 |
| 2006/0094346 A1 * | 5/2006 | Haupt et al. | .................. | 454/154 |
| 2007/0012052 A1 * | 1/2007 | Butler et al. | .................... | 62/181 |
| 2007/0104582 A1 * | 5/2007 | Rahai et al. | .............. | 416/197 A |
| 2011/0153090 A1 * | 6/2011 | Besore et al. | ................. | 700/278 |

\* cited by examiner

*Primary Examiner* — Peter J Bertheaud
*Assistant Examiner* — Dnyanesh Kasture
(74) *Attorney, Agent, or Firm* — Hovey Williams LLP

(57) ABSTRACT

An HVAC system includes a heating/cooling element; an electric motor; a speed sensor; and a control device. The heating/cooling element includes a heating element, a cooling element, and heat exchangers. The motor has a rotatable shaft coupled with a blower wheel. The speed sensor senses a rotational speed of the motor shaft and the blower wheel and includes a magnet coupled with the motor shaft for rotation therewith; and a coil assembly mounted concentrically over the magnet and operable to generate an alternating signal when the magnet rotates relative to the coil. The alternating signal has an electrical characteristic that is generally proportional to the rotational speed of the shaft. The control device determines a rotational speed of the motor shaft and disables operation of the heating/cooling element when the alternating signal indicates that the rotational speed of the shaft drops below a minimum threshold speed.

13 Claims, 5 Drawing Sheets

HVAC BLOWER MOTOR WITH SPEED SENSOR

FIELD OF THE INVENTION

The present invention relates to blower motors and controls used in residential heating, ventilation, and air conditioning (HVAC) systems.

BACKGROUND

HVAC systems such as furnaces, air conditioners and the like typically include a heating element and/or a cooling element (collectively referred to herein as "heating/cooling element"); a blower for directing air over the heating/cooling element for subsequent delivery to a building, room, or other area serviced by the HVAC system; and an enclosure for enclosing the heating/cooling element and blower. HVAC systems may also include duct work, various controls, and other components.

It is important that the heating/cooling element of an HVAC system not be operated for too long without concurrent operation of the blower to avoid damage to components of the HVAC system. For example, many newer HVAC enclosures are made of composite plastic materials that may melt or otherwise become damaged if a heating element is operated for too long without operation of the blower. Similarly, the heating element itself may be damaged by excess heat or a cooling element may freeze if the blower isn't operated.

To prevent such damage, HVAC systems typically include control systems that automatically operate their blower motors a short time after the heating/cooling elements are activated (a delay is typically introduced to give the heating/cooling elements time to heat or cool to avoid the blowing of cold air into a room in the winter or hot air in the summer.) Such controls are not effective, however, if the blower motor itself, or the wiring thereto, is damaged, because the blower motor may not turn on even though the control system may call for its operation.

To account for possible blower failure, many HVAC systems include air flow vanes, pressure differential sensors, and the like installed in their enclosures or duct work to sense blower air flow to ensure a minimum air flow over the heating/cooling elements. Unfortunately, these types of air flow sensors are inaccurate, difficult to install, and prone to breakage.

Accordingly, there is a need for an improved way to ensure that a blower motor of an HVAC system is providing sufficient air flow.

SUMMARY

The present invention solves the above-described problems and provides a distinct advance in the art of HVAC systems and blower motor control systems. More particularly, the present invention provides a reliable, cost-effective, and accurate way to ensure proper operation of a blower motor in an HVAC system.

An embodiment of the invention is an HVAC system broadly comprising a heating/cooling element; a blower motor; a speed sensor; and a control device. The heating/cooling element may include any conventional heating element and/or cooling element such as a gas-fired burner, an electrical heating coil, refrigerant coil, etc. The heating/cooling element may also include, or be connected to, associated heat exchangers and other components.

The blower motor has a rotatable shaft coupled with a blower wheel or fan for blowing air over the heating/cooling element. The blower motor may be a fixed speed motor, a multi-speed motor, or a variable speed motor and may be an induction type motor, brush type motor, or any other type motor.

The speed sensor is provided for sensing a rotational speed of the motor shaft and thus the blower wheel. In one embodiment, the speed sensor comprises a magnet coupled with the motor shaft for rotation therewith; and a coil assembly mounted concentrically over the magnet and operable to generate an alternating signal when the magnet rotates relative to the coil. The alternating signal has an electrical characteristic that is generally proportional to the rotational speed of the shaft and hence the blower wheel.

The control device receives the alternating signal from the speed sensor and calculates or otherwise determines a rotational speed of the motor shaft. In one embodiment, the control device disables operation of the heating/cooling element when the alternating signal indicates that the rotational speed of the shaft drops below a minimum threshold speed. The control device may also provide appropriate error warnings or other indications of blower motor malfunction.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
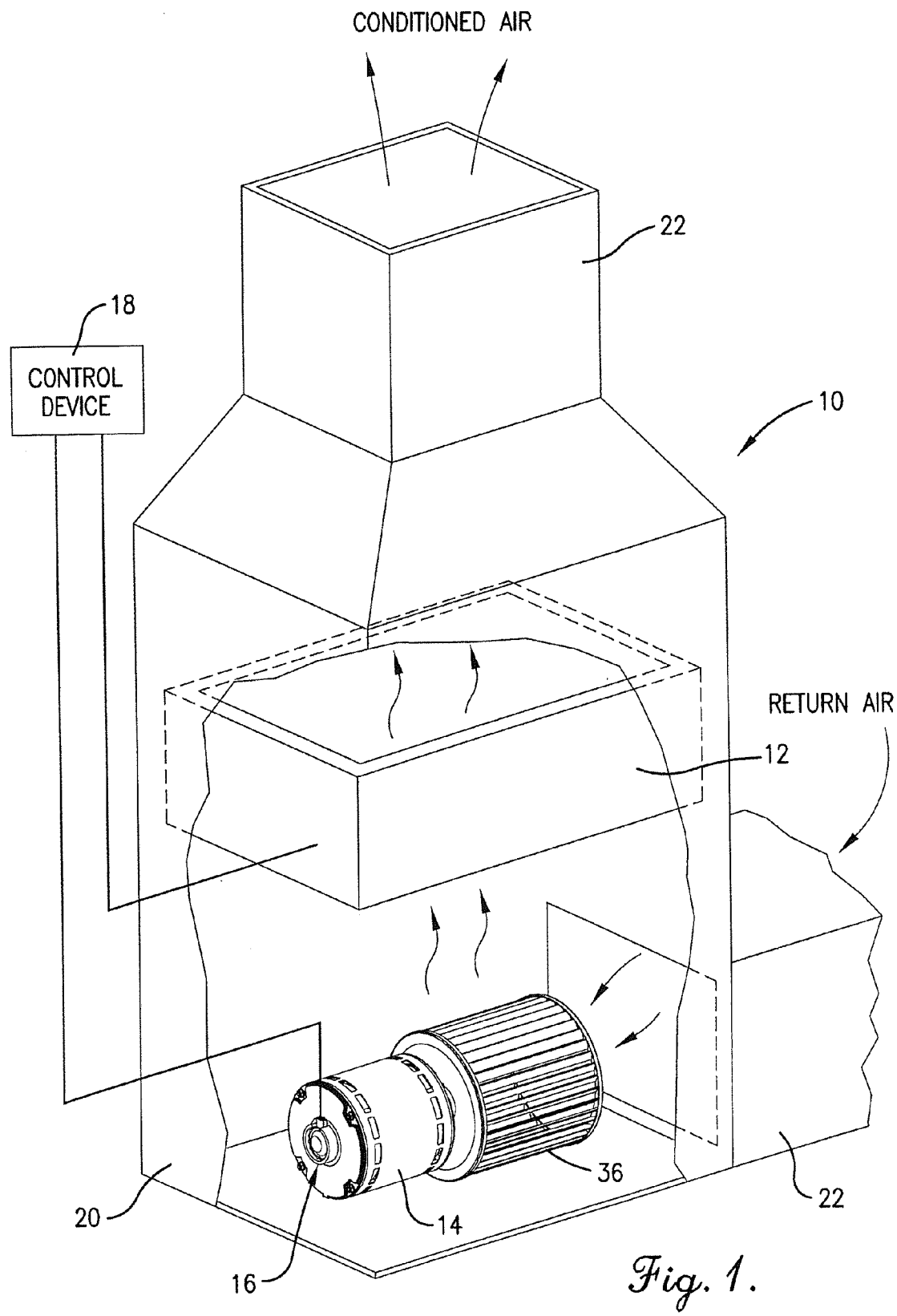
FIG. 1 is a schematic diagram of an exemplary HVAC system constructed in accordance with an embodiment of the invention.
Figure 2:
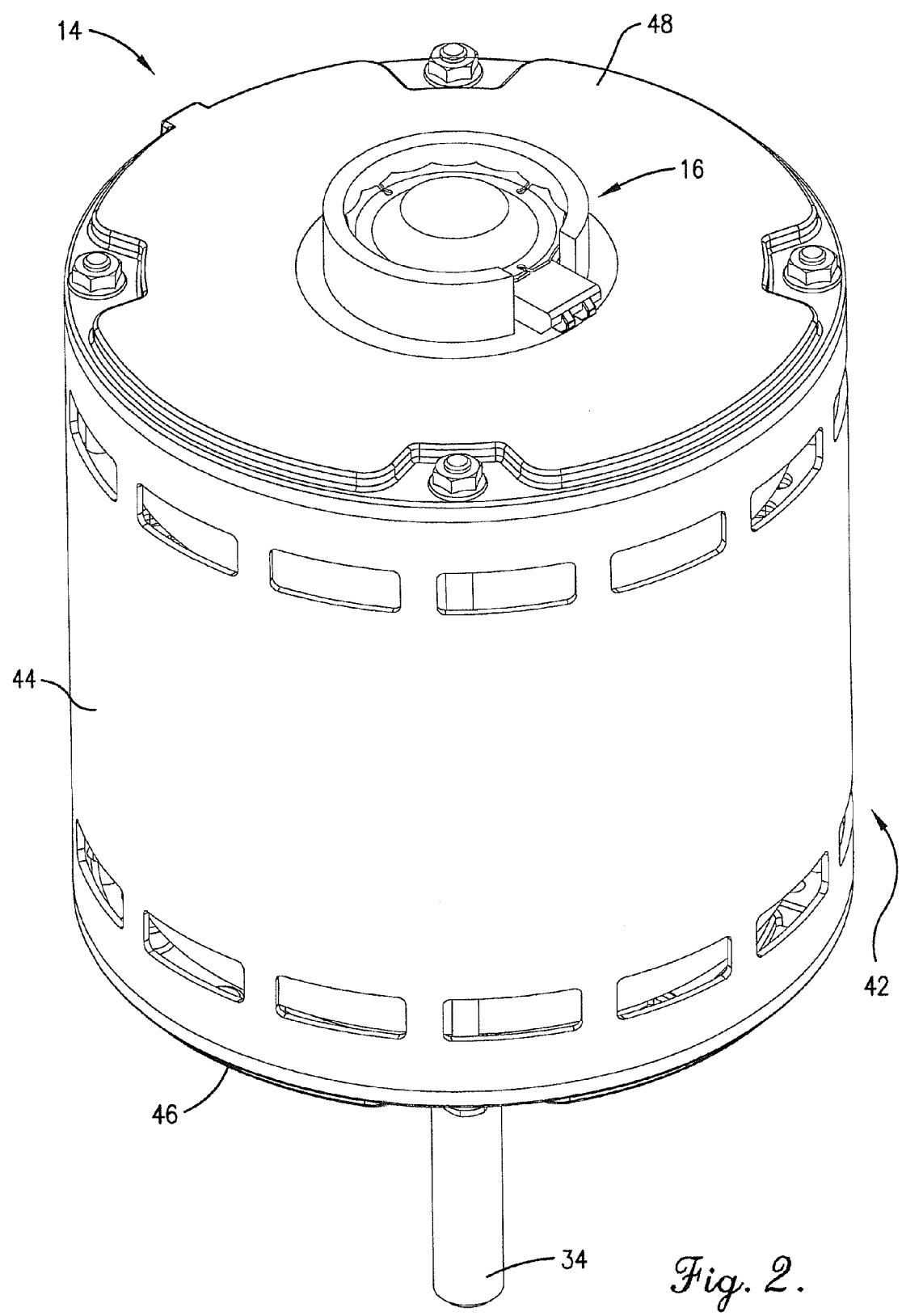
FIG. 2 is a perspective view of a blower motor of the HVAC system.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIG. 1, an HVAC system 10 constructed in accordance with various embodiments of the invention is illustrated. The illustrated HVAC system 10 broadly comprises a heating/cooling element 12; a blower motor 14; a speed sensor 16; a control device 18; and an enclosure 20. The HVAC system 10 may also include conventional duct work 22, controls, and other components conventionally found in HVAC systems and may serve any building room, or other area to be cooled and/or heated.

The heating/cooling element 12 may include any conventional heating elements and/or cooling elements such as gas-fired burners, electric heating coils, electric or gas-powered refrigerant coils etc. The heating/cooling element may also comprise one or more heat exchangers. Thus, as used herein, the term "heating/cooling element" may encompass a heating element or cooling element alone or a combination of a heating element and/or a cooling element with one or more heat exchangers and/or other components. Although only one heating/cooling element 12 is illustrated in FIG. 1, the HVAC system 10 may include any number of heating/cooling elements without departing from the scope of the invention.

The blower motor 14 blows air over the heating/cooling element to transfer heat to or from the air for subsequent delivery to an area serviced by the HVAC system. The motor includes a conventional rotor 24 and stator electric coil assembly 26 that together rotate a drive shaft 28. The drive shaft 28 is supported for rotation by two or more bearing assemblies 30, 32. A first end 34 of the shaft 28 is keyed for supporting a conventional blower wheel 36, fan or other type of air-moving device and a second end 38 is coupled with the speed sensor 16 as described in more detail below. The second end 38 of the shaft has a rivet hole 40 or other fastener-receiving hole therein, the purpose of which is described below. The rotor 24, coil 26, bearings 30, 32, and shaft 34 are supported within a motor enclosure or "can" 42 that includes a cylindrical sidewall 44, a front cover plate 46 out of which extends the first end 34 of the shaft, and a rear cover plate 48 out of which extends the speed sensor 16.

The blower motor 14 may be a single speed motor, a multi-speed motor, a variable speed motor, an induction motor, a brushless permanent magnet motor, a switched reluctance motor, a brushed DC motor, or any other type of motor suitable for use in HVAC systems. In one embodiment, the motor is a ½ HP electric PSC type motor.

Figure 3:
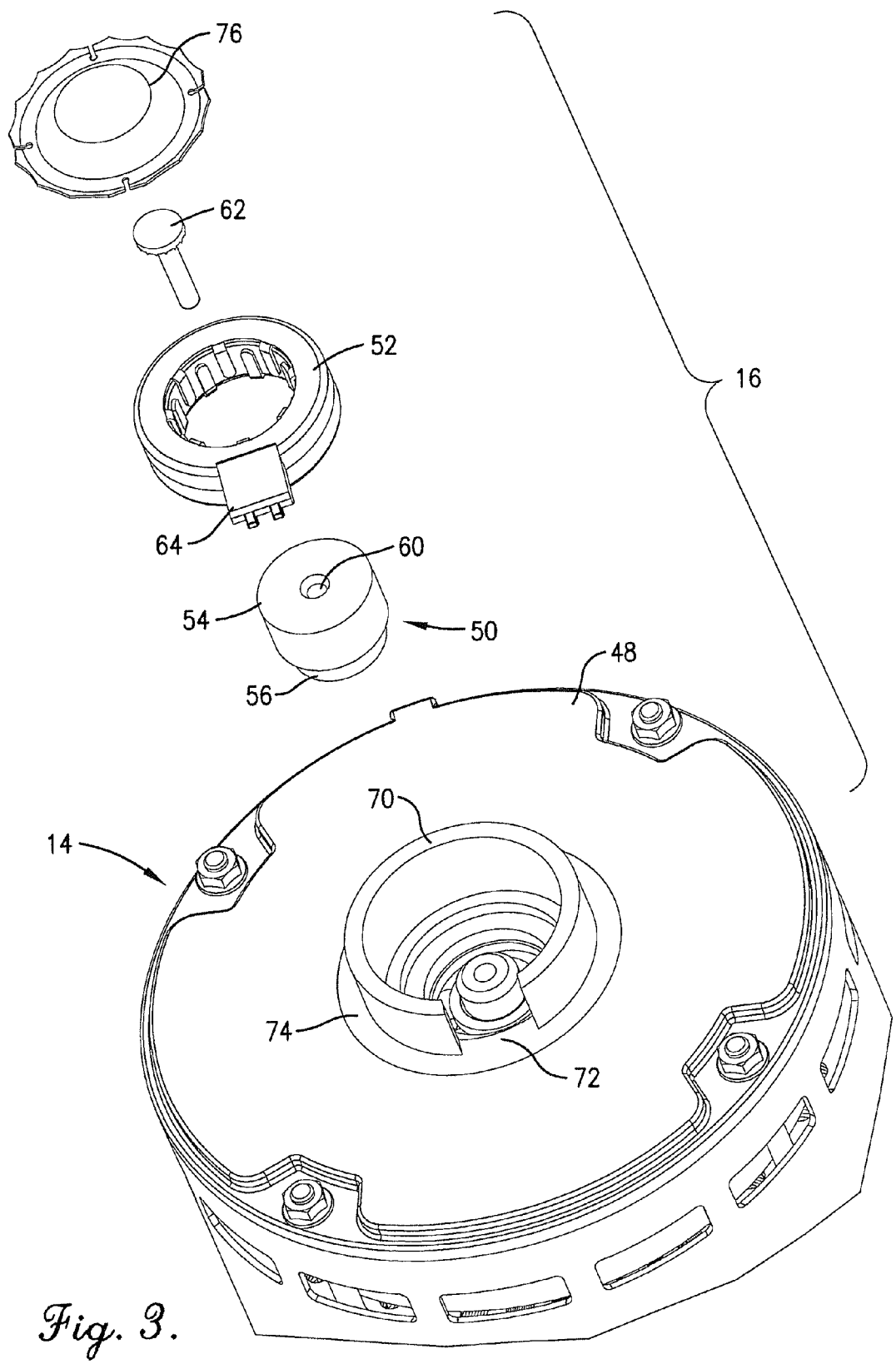
FIG. 3 is a fragmentary perspective view of the lower motor with the speed sensor components shown exploded.
Figure 4:
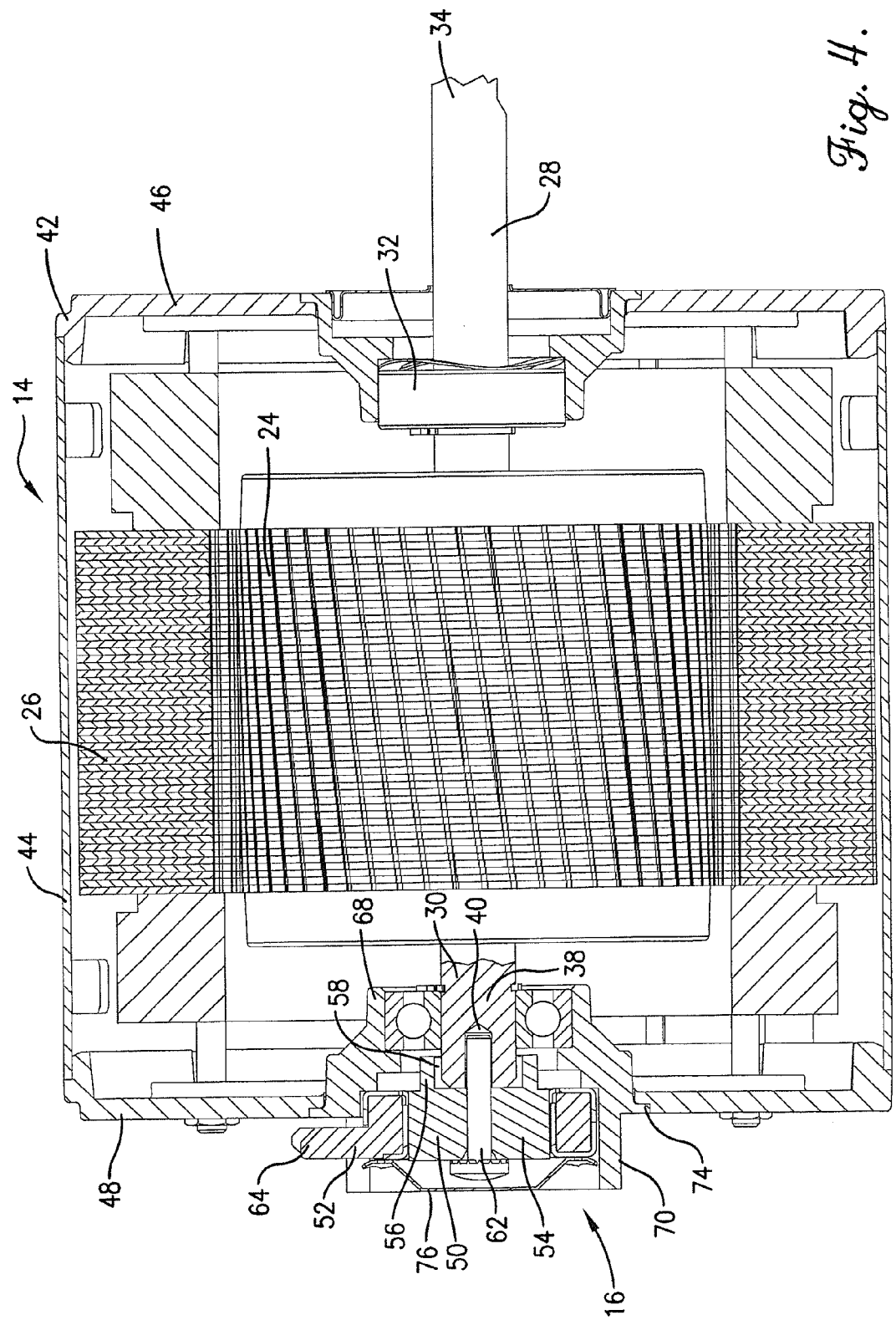
FIG. 4 is a vertical cross sectional view of the blower motor.

The speed sensor 16 is provided for sensing a rotational speed of the motor shaft 28 and thus the blower wheel 36. As best illustrated in FIGS. 3 and 4, one embodiment of the speed sensor 16 comprises a magnet 50 coupled with the second end 38 of the motor shaft for rotation therewith; and a coil assembly 52 mounted concentrically over the magnet 50.

The magnet 50 may be any size, shape, and strength. In one embodiment, the magnet is a generally cylindrical permanent magnet having a magnetic flux density of approximately 1800 to 2200 gauss. The magnet 50 has a relatively enlarged diameter portion 54 and a relatively reduced diameter portion 56. The reduced diameter portion 56 has a circular central cavity 58 or opening that fits over the second end 38 of the motor shaft 28. The enlarged diameter portion 54 of the magnet has a central hole 60 that is axially aligned with the hole 40 in the second end 38 of the shaft. A rivet or other fastener 62 extends through the hole 60 in the magnet and into the hole 40 in the shaft to couple the magnet to the shaft.

The coil assembly 52 may also be any size, shape, and electrical rating, and in one embodiment is 40 mm outside diameter, 24.5 mm inside diameter, 12.5 mm thick, 710 turns of 0.112 mm diameter magnet wire wound on a bobbin, 16 poles. As best shown in FIGS. 3 and 4, the coil assembly 52 is concentrically mounted over the enlarged portion 54 of the magnet 50 and includes an output terminal, port, or other connector 64.

Figure 5:
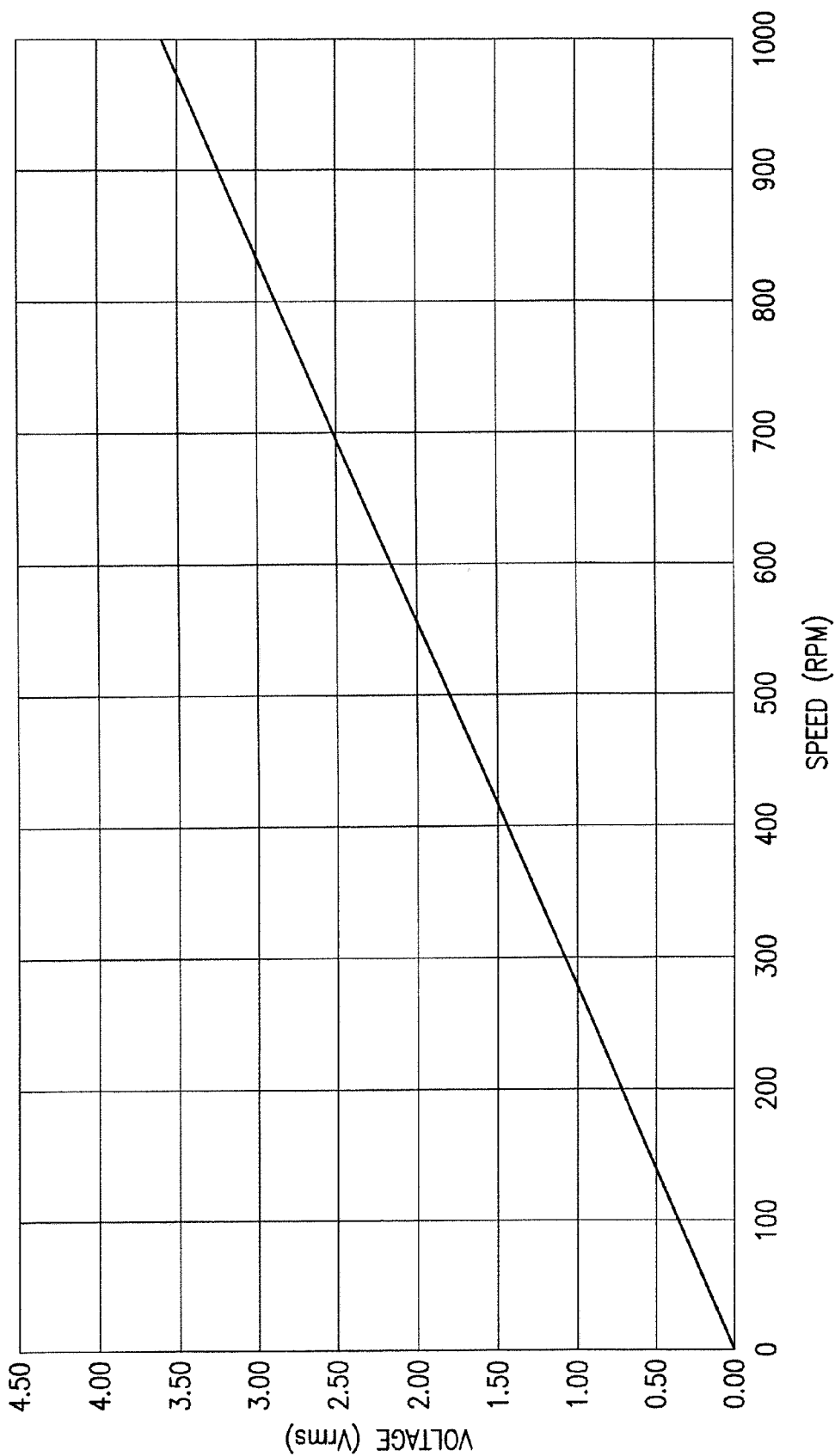
FIG. 5 is a graph showing an electrical output of the speed sensor as a function of the speed of the motor shaft.

The coil assembly 52 generates an alternating signal when the magnet 50 rotates relative to the coil 52 and outputs this signal to the control device 18 via the connector 64. The alternating signal has a voltage, frequency, or other electrical characteristic that is generally proportional to the rotational speed of the shaft 28. FIG. 5 illustrates the average voltage output of the coil assembly as a function of the motor shaft speed. Importantly, the magnet 50 and coil assembly 52 are sized and configured to output a relatively low, but easily detectable voltage signal when the motor is operating at or near its minimum acceptable speed. In one embodiment, the magnet 50 and coil assembly 52 are sized and configured so that the alternating signal has a peak magnitude of approximately 1-3 volts when the shaft 28 is rotating at 400-800 RPM. In another embodiment, the magnet 50 and coil 52 are sized and configured so that the coil outputs a signal of approximately 2 volts at a motor speed of approximately 500-600 RPM, which in one embodiment is the minimum safe speed of the motor.

The components of the speed sensor 16 may be partially supported by an insert 66. As best illustrated in FIG. 3, one end 68 of the insert is generally ring-shaped and fits over one of the shaft bearings 30. The opposite end 70 of the insert is also generally ring-shaped and includes a cut-out 72 for accommodating the electrical connector 64 on the coil assembly 52. An annular flange 74 is positioned between the two ends and fits within a recessed portion of the rear cover plate 48 of the enclosure. A speed sensor cover 76 closes the open end of the insert 66 and prevents axial movement of the coil assembly 52.

The control device 18 receives the alternating signal from the speed sensor 16 and calculates or otherwise determines the current speed of the shaft 28 and hence the blower wheel 38 based on the alternating signal. For example, the control device 18 may implement a formula or access a look-up table that equates a voltage or frequency of the alternating signal to a shaft speed. In one embodiment, the control device 18 disables operation of the heating/cooling element when the alternating signal indicates that the rotational speed of the shaft drops below a threshold speed such as 400-800 RPM when the blower motor is supposed to be operating.

The control device 18 may also provide a suitable alarm or error message upon detection of low motor shaft speed. For example, the control device 18 may disable the heating/cooling element and send an error message such as "Blower Motor Malfunction" to a display unit on a thermostat controller or other device.

The control device 18 can be implemented in hardware, software, firmware, or a combination thereof. In one embodiment, the control device is part of a furnace control board of the HVAC system 10. The control functions of the control device 18 may be implemented with one or more computer programs stored in or on computer-readable medium residing on or accessible by the control device. Each computer program preferably comprises an ordered listing of executable instructions for implementing logical functions in the control device. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The enclosure 20 is conventional and may be any size and shape and constructed of any materials such as metal, fiberglass, or plastic. As illustrated, the enclosure may be connected with duct work that draws return air toward the blower motor 14 and heating/cooling element and other duct work that delivers conditioned air to an area serviced by the HVAC system 10.

Although the invention has been described with reference to the embodiments illustrated in the attached drawing figures, it is noted that equivalents may be employed and substitutions made herein without departing from the scope of the invention as recited in the claims. For example, although many aspects of the present invention are particularly applicable to HVAC blower motors, they may also be used with electric motors designed for powering fans and the like in other applications. Moreover, all of the above-described embodiments of the invention are independent of motor technology. Induction, brushless permanent magnet, switched reluctance, brushed DC, and other types of motors may be used. Related technologies are disclosed in U.S. Pat. No. 5,818,194, which is hereby incorporated by reference in its entirety.

Having thus described the preferred embodiment of the invention, what is claimed as new and desired to be protected by Letters Patent includes the following:

1. An HVAC system comprising:
a heating/cooling element;
a motor having a housing and a rotatable shaft coupled with an air-moving device for blowing air over the heating/cooling element;
a speed sensor for sensing a rotational speed of the shaft and thus the air moving device, the speed sensor comprising:
    a magnet coupled with the shaft for rotation therewith, the magnet having a recessed laterally-extending surface and an inwardly-facing wall extending axially from the recessed laterally-extending surface, the recessed laterally-extending surface and the inwardly-facing wall cooperatively forming an open-ended axial cavity configured to receive the distal end of the shaft therein such that the distal end of the shaft abuts the recessed laterally-extending surface, the magnet further including a hole extending axially through the magnet, the hole being smaller in diameter than the open-ended axial cavity;
    a fastener extending through the hole in the magnet and being secured in the fastener hole of the shaft so as to secure the magnet to the shaft;
    a coil assembly mounted concentrically over the magnet and operable to generate an alternating signal when the magnet rotates relative to the coil, the alternating signal having an electrical characteristic that is proportional to the rotational speed of the shaft; and
    a bearing insert that is mounted to the housing of the motor, the bearing insert being mounted partially around a bearing of the shaft and supporting the coil assembly on one end of the motor; and
a control device for receiving the alternating signal from the speed sensor and for disabling operation of the heating/cooling element when the alternating signal indicates that the rotational speed of the shaft drops below a threshold speed.

2. The HVAC system as set forth in claim 1, wherein the electrical characteristic is voltage or frequency.

3. The HVAC system as set forth in claim 1, wherein the control device is a control board of the HVAC system.

4. The HVAC system as set forth in claim 1, wherein the control device is a stand-alone controller.

5. The HVAC system as set forth in claim 1, wherein the magnet has a central hole, the shaft has a hole in one end thereof that is axially aligned with the hole in the magnet, and the speed sensor further includes a fastener that extends through the hole in the magnet and into the hole in the shaft to couple the magnet to the shaft.

6. The HVAC system as set forth in claim 1, wherein the threshold speed is between 400-800 RPM.

7. The HVAC system as set forth in claim 1, wherein the magnet and coil assembly are sized and configured so that the alternating signal has a peak magnitude of from 1-2 volts when the shaft is rotating at the threshold speed.

8. The HVAC system of claim 1, wherein the control device is configured to provide an alarm upon detection of the shaft spinning at a speed lower than a predetermined shaft speed.

9. The HVAC system of claim 1, wherein the control device is configured to disable the heating/cooling element upon detection of the shaft spinning at a speed lower than a predetermined shaft speed.

10. The HVAC system of claim 1, wherein the control device is configured to send an error message to a display unit upon detection of the shaft spinning at a speed lower than a predetermined shaft speed.

11. An HVAC system comprising:
a heating element;
an electric motor having a rotatable shaft coupled with a blower wheel for blowing air over the heating element, the rotatable shaft having a distal end and forming a fastener hole in the distal end;
a speed sensor for sensing a rotational speed of the shaft and thus the blower wheel, the speed sensor comprising:
    a magnet coupled with the shaft for rotation therewith, the magnet having a recessed laterally-extending surface and an inwardly-facing wall extending axially from the recessed laterally-extending surface, the recessed laterally-extending surface and the inwardly-facing wall cooperatively forming an open-ended axial cavity configured to receive the distal end of the shaft therein such that the distal end of the shaft abuts the recessed laterally-extending surface, the magnet further including a hole extending axially through the magnet, the hole being smaller in diameter than the open-ended axial cavity;

a fastener extending through the hole in the magnet and being secured in the fastener hole of the shaft so as to secure the magnet to the shaft;

a coil assembly mounted concentrically over the magnet and operable to generate an alternating signal when the magnet rotates relative to the coil, the alternating signal having an electrical characteristic that is proportional to the rotational speed of the magnet; and a bearing insert that is mounted partially around a bearing of the rotatable shaft and supports the coil assembly on one end of the electric motor; and a control device integrated into an HVAC control board for receiving the alternating signal from the speed sensor and for disabling operation of the heating element when the alternating signal indicates that the rotational speed of the shaft drops below 800 RPM.

12. The HVAC system as set forth in claim 11, wherein the electrical characteristic is voltage or frequency.

13. The HVAC system as set forth in claim 11, wherein the magnet and coil assembly are sized and configured so that the alternating signal has a peak magnitude of from 1-2 volts when the shaft is rotating at 400-800 RPM.

\* \* \* \* \*